Aug. 9, 1938.      H. S. JANDUS      2,126,016
HAND BRAKE LEVER
Filed July 3, 1937
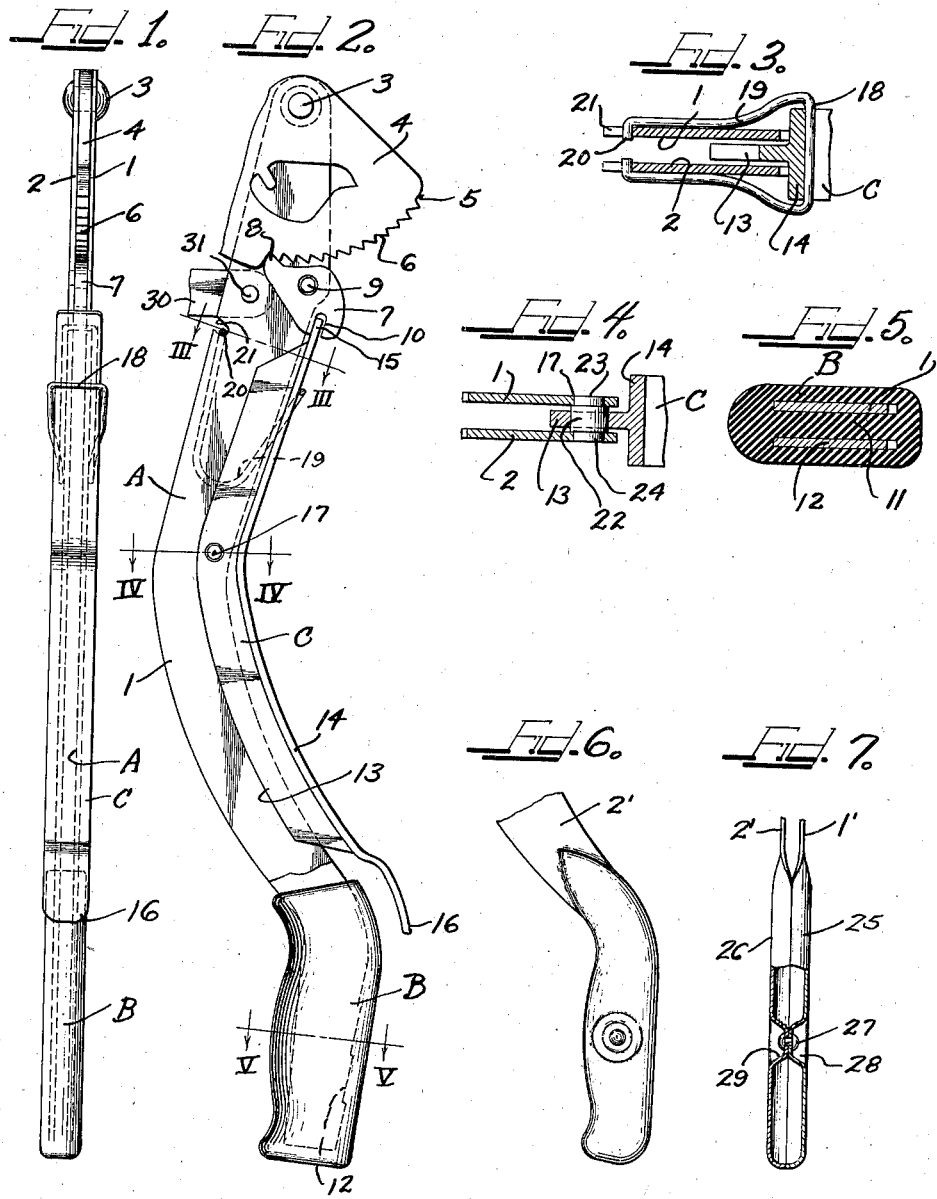
Inventor
HERBERT S. JANDUS.

Patented Aug. 9, 1938

2,126,016

UNITED STATES PATENT OFFICE 2,126,016

HAND BRAKE LEVER

Herbert S. Jandus, Detroit, Mich., assignor to Oakes Products Corporation, North Chicago, Ill., a corporation of Michigan Application July 3, 1937, Serial No. 151,781

6 Claims. (Cl. 74—537)

The present invention relates to hand brake levers and is concerned more particularly with a lever construction wherein the lever may be exceedingly inexpensively manufactured without any drawing or forming operations.

An object of the present invention is to provide a hand brake lever of such construction that it may be manufactured at minimum manufacturing costs.

Another object of the present invention is to provide a hand brake lever wherein the parts are, in the main, formed of stampings and assembled at minimum labor expense.

The above, other and further objects of the present invention will be explained in the following description and accompanying drawing.

The accompanying drawing illustrates embodiments of the present invention and the views thereof are as follows:

Figure 1 is an edge elevational view of a lever constructed in accordance with the principles of the present invention, showing the lever as of the dash type.

Figure 2 is a side elevational view of part of the lever of Figure 1, with one side member removed to show details of construction, and showing the parts in the position occupied when the lever is in "off" position.

Figure 3 is an enlarged transverse sectional view taken substantially in the plane indicated by line III—III of Figure 2.

Figure 4 is an enlarged transverse sectional view taken substantially in the plane indicated by line IV—IV of Figure 2.

Figure 5 is an enlarged transverse sectional view taken substantially in the plane indicated by the line V—V of Figure 2.

Figure 6 is a side elevational view of a modified grip portion of lever.

Figure 7 is an edge view, partially in elevation and partially in section, of the grip portion of Figure 6.

The drawing will now be explained.

The lever of the illustrated form of the present invention includes what is herein termed a shaft A which is formed by two similarly shaped flat stampings, forming side walls 1 and 2. The side walls 1 and 2 are apertured, near one end of the shaft, to pivotally connect the lever shaft to a support, and at the other end fashioned to provide a hand grip portion.

The lever is herein illustrated as pivoted at 3 to a stamped support 4 having an arcuate surface 5 provided with a clutching surface constituting, in the present instance, the ratchet teeth 6. The lever shaft is pivoted to the support 4 astraddle the same, thus presenting the ratchet teeth 6 between side walls 1 and 2.

Stamped out of the support 4, is a pawl 7 having a point 8 for cooperating with the ratchet teeth 6, in the usual manner. The pawl is pivoted between the side walls 1 and 2 by tubular pivot 9 and is formed with a U-shaped slot or notch 10 for a purpose to be later explained. The opposite faces of the slot 10 are substantially parallel.

The side walls 1 and 2 may be stamped to provide the desired size and shape. The illustrated lever shows the side walls curved in length to offset the hand grip portion of the lever from the portion thereof adjacent the pivoted end. The lever shaft might, of course, be of other shape than that illustrated.

The lever of Figures 1 and 2 is provided with a molded rubber handle portion B, shaped to fit over the adjacent extremities of the side walls, as shown in Figures 1 and 2. The handle is provided with a part 11 which is entered between the side walls 1 and 2 when the handle is applied. If desired serrations 12 may be made in corresponding edges of the grip portions of the side walls to provide security against accidental removal of the handle B from the lever shaft. The handle B is suitably shaped to form a comfortable grip for the operator when manipulating the lever.

For manipulating the pawl 7, a clutch or pawl release member C is provided which is of rolled metal of T-section. The pawl release member C is bent so that its length will generally conform to the contour of the lever shaft A as will be readily apparent.

Release member C is applied to shaft A with its web 15 entered between the side walls 1 and 2 and its flange 14 overlapping an edge margin of the shaft and covering the slot formed by the spacing between the side walls. At the end of the release member adjacent the pawl 7, the web is trimmed away, thus leaving an extremity 15, of the flange 14, which is entered in the notch 10 in the pawl, when the parts are assembled. The width of the slot 10 is but slightly greater than the thickness of the extension 15 so that the pawl may be rocked by rocking movement of the release member, without binding, and yet constructed to reduce rattle to a minimum.

The other end of the flange 14 of the release member C, as at 16, is shown as extending part way over the handle B of the lever to form a manipulating part of the release member for rocking it to release the pawl from latched engagement with the ratchet. The web 13 of the release member is trimmed away at this end of the member so that the member will function in the manner desired.

The release member C is pivoted to the lever shaft A by means of a pin or tubular pivot 17, with the pivot passing through the web 13 in the release member and through registering apertures in the side walls 1 and 2 of the lever shaft A.

The connection of the extension 15 of the flange 14 of the release member and the pawl 7 is a positive one for rocking the pawl in either direction, by means of the release member.

In order to maintain the release member C in one position, and the pawl in latched engagement with the ratchet, spring means are provided.

The spring means illustrated in the present instance, consists of a wire bent into substantially U-shape in end view and side view, forming a cross piece 18 which bears against the outer portion of the flange 14 of the release member, and with its legs looped, as at 19 and bearing against the outer surfaces of the side walls 1 and 2 of the shaft, and with the free ends inturned as at 20 and entered in notches 21 formed in the side members 1 and 2 as shown in Figures 2 and 3.

The pivot 17 for connecting the release member C to the shaft A is illustrated as having an enlarged central cylindrical portion 22 which enters a correspondingly shaped aperture in the web 13 of the release member, and reduced end portions 23 and 24 for entering correspondingly shaped apertures in the side walls 1 and 2 respectively. The enlarged cylindrical portion 22 tends to prevent the side walls 1 and 2 from binding against the web 13 of the release member incidental to the securement of the pivot in position.

If it is desired to make the hand grip portion of the lever A integral with the shaft, this can be done by forming each of the side walls 1 and 2 with half handle portions 25 and 26 respectively, as illustrated in Figures 6 and 7, and securing together these handle portions by means of a rivet 27, which passes through apertures in depressed portions 28 and 29 of the handle portions 25 and 26.

The formation of the lever shaft A as having two similarly shaped flat stampings, provides a shaft which in appearance has slotted edges, the slots being defined by the distance apart of the side walls.

The assembly of the release member C, with its web 13 working between the side walls 1 and 2 and entered from one edge of the lever, causes the flange 14 of the release member to cover the slot in this edge of the shaft, thereby adding a finished appearance to the completed lever.

A yoke 30 is pivotally connected at 31 to the side walls 1 and 2, for connection to the lever, of a cable or rod, which in turn is connected to the brake mechanism of the vehicle.

By reason of the formation of the slot 10 in the pawl 7 with parallel sides, engaging the extension 15 of the release member C, engagement between the release member C and the pawl 7 is a positive one. That is to say, the pawl 7 cannot be rocked except by proper rocking movement of the release member C on pivot 17.

The spring functions to maintain the release member C normally in one position and the pawl 7 in latched engagement with the ratchet.

To apply the brakes of an automotive vehicle, equipped with a lever construction of the present invention, the operator grasps the handle B moving the lever in counter-clockwise direction. Such movement may be accomplished without manipulating the release member C, as during such movement the point 8 of the pawl will travel along the ratchet teeth 6 with a clicking sound. If it is desired the portion 16 may be moved towards the handle B whereupon the pawl will be released and the lever applied without such clicking sound.

When the lever is moved to the desired position, pressure against the handle B is released whereupon the spring becomes effective to latch the pawl into a tooth of the ratchet 6.

To release the lever from set position, the operator grasps the handle B with his hand, gives the lever a very slight movement in counter-clockwise direction, depresses portion 16 of the release member C which in turn rocks the pawl in counter-clockwise direction about its pivot to free it from latched engagement with a ratchet tooth and the lever is then returned to "off" position.

It will be observed that the lever of the present invention is one, except for the modifications shown in Figures 6 and 7, which can be manufactured without any drawing or forming operations.

The formation of the side members, the support 4, and the pawl 7, as stampings, reduces the costs to a minimum. The manner of assembly of the parts is simple so that the lever may be readily assembled with a minimum of labor costs.

The lever of the present invention may be constructed at minimum costs, that is to say, much less than the conventional types of levers now being manufactured, without in any manner impairing its strength or effectiveness.

While the lever of the present invention has been illustrated and described herein as provided with a sector and pawl of conventional type, it is applicable to the swinging sector type of lever as well, i. e., one wherein the sector is pivotally related to the shaft at a point other than the pivotal connection of the shaft to its support.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. In combination, a stamped toothed ratchet sector, a lever shaft comprised of two stamped similarly shaped parallel side wall members pivoted at one end to and astraddle said sector, said side wall members being arranged in parallel relation and laterally spaced, a pawl pivoted to the lever to cooperate with said ratchet for clutching the lever in adjusted position, pawl release means including an element positioned along the major portion of the length of said lever shaft, said element consisting of a rolled metal piece of T-section, said release member arranged with its web working between said side walls and with its flange overlying an edge margin of the shaft to cover the space between said walls, pivot means engaging said walls and the web of said release member for pivotally connecting the release member to the lever shaft, said release member having a manipulating part adjacent the grip portion of said lever shaft for rocking the release member in one direction, means connecting said release member and said pawl for positively moving said pawl into and out of clutching engagement with said ratchet, and spring means acting against said release member for normally holding said release member in one position and said pawl in latched engagement with the ratchet.

2. An emergency brake control mechanism comprising a stamped member having a clutching surface, a lever shaft consisting of two similarly shaped flat stampings arranged in parallel spaced relation, said stampings being apertured adjacent one end for pivotal connection to said member astride the same and having a hand grip portion at the other end, a clutch member pivoted between said stampings for engaging with a clutching surface of said first stamped member, a clutch release member of rolled metal of T-section throughout a major portion of its length arranged with its web working between said stampings and with its flange overlying an edge margin of the lever shaft to cover the space between said stampings and extending substantially coincident with a major portion of the lever shaft, means through said stampings and release member web for pivotally connecting said release member to said lever shaft, said release member having a manipulating part adjacent the grip portion of the lever shaft for rocking said member in one direction, means connecting said release member and said clutch member for positively moving said clutch member into and out of clutching engagement with said first member, and spring means acting against said release member between the release member pivot and said clutch member for normally holding the release member in one position and the clutch member in clutch engagement with said first member.

3. An emergency brake lever construction, including a lever shaft consisting of two identically shaped flat stampings arranged in parallel and laterally spaced relation, a stamped ratchet member arranged in pivotal relation with said lever shaft, a stamped pawl pivotally supported between said stampings in position for effecting latching engagement with said ratchet, said pawl having a U-shaped notch in it, a pawl release member of rolled metal of T-section arranged with its web working between said stampings and with its flange overlying one edge margin of the shaft to cover the space between the stampings and extending substantially coincident with a major portion of the lever shaft, pivotal means engaging said stampings and the web of said release member for pivotally connecting them together, said release member having an end extension working within the pawl notch for positively moving said pawl into and out of clutched engagement with said ratchet, and spring means acting against said release member between the release member pivot and the pawl for normally holding said release member in one position and said pawl in latched engagement.

4. A fabricated emergency brake lever construction including a stamped sector having ratchet teeth along an arcuate edge, a lever shaft comprising two similarly shaped members arranged in laterally spaced side by side parallel relation and pivoted to said sector astraddle the same, a pawl pivoted between said members in position to cooperate with the ratchet teeth to latch the lever in adjusted position, said pawl having a U-shaped notch in it, a handle of moldable material applied to the other end of the lever shaft and having a part enterable between said members to space them, a pawl release member comprising a rolled metal piece of T-section arranged with its web working between the two said shaft members and between the pawl and said handle, the flange of said release member at one end having a manipulating portion adjacent said handle and at the other end a portion entered in the pawl notch to positively connect the release member and pawl for rocking movement, a spring connecting said lever shaft and release member for normally holding said release member in position to cause latching engagement of the pawl with the ratchet, and a pivot through said shaft members and the web of the release member for connecting said members in pivotal relation.

5. An emergency brake control mechanism comprising a stamped member having a clutching surface, a lever shaft consisting of two similarly shaped flat stampings arranged in parallel spaced relation, said stampings being apertured adjacent one end for pivotal connection to said member and having a hand grip portion at the other end, a clutch member pivoted between said stampings for engaging the clutching surface of said first stamped member, a clutch release member of rolled metal of T-section throughout a major portion of its length arranged with its web working between said stampings and with its flange overlying an edge margin of the lever shaft to cover the space between said stampings and extending substantially coincident with a major portion of the lever shaft, means through said stampings and release member web for pivotally connecting said release member to said lever shaft, said release member having a manipulating part adjacent the grip portion of the lever shaft for rocking said member in one direction, means for connecting said release member and said clutch member for positively moving said clutch member into and out of clutching engagement with clutching surface of said first member, and spring means acting against said release member for normally holding the release member in one position and the clutch member in clutched engagement with said first member.

6. An emergency brake control mechanism comprising a stamped member having a clutching surface, a lever shaft consisting of two flat similarly shaped stampings arranged in parallel spaced relation, said stampings being apertured near one end of said shaft for pivotal connection with said stamped member and being formed to provide a handgrip portion at the other end of the shaft, a clutch member working between said stampings in position to engage said clutching surface to hold said shaft in adjusted position, a clutch release member consisting of a formed metal piece of T-section pivoted through its web between said stampings for rocking movement and having a manipulating part adjacent the grip portion of said shaft, and means responsive to rocking movement of said release member for oscillating said clutch member between said stampings into and out of holding engagement with said clutching surface.

HERBERT S. JANDUS.